Patented May 3, 1927.

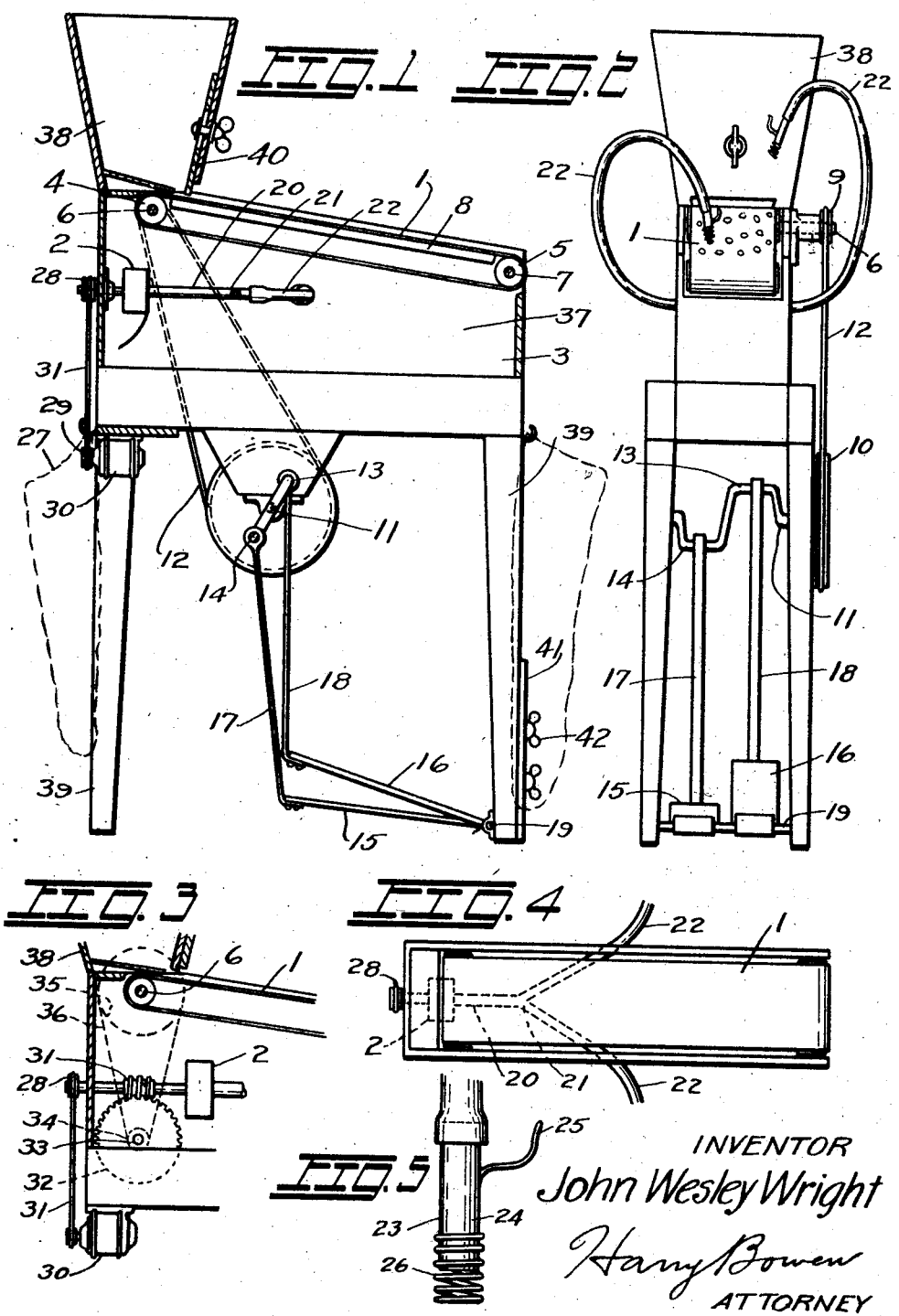

1,627,221

UNITED STATES PATENT OFFICE.

JOHN W. WRIGHT, OF PUYALLUP, WASHINGTON.

DEVICE FOR SORTING BEANS.

Application filed August 1, 1925. Serial No. 47,397.

The invention is a device for enabling the efficient picking of bad beans from a quantity of beans.

The object of the invention is to provide a device by which the bad beans may readily be picked out of a supply of beans.

Another object of the invention is to provide a means whereby bad beans may be picked out of a supply of beans without manually handling the beans.

A further object of the invention is to provide a means for picking the bad beans out of a supply of beans which will make it possible to take only one bean at a time.

A still further object of the invention is to provide a device whereby bad beans may be picked out of a supply of beans by suction.

And a still further object of the invention is to provide a device for picking bad beans out of a supply of beans, which is of a simple and economical construction.

With these ends in view, the invention embodies a continuous belt, means for driving the said belt, a hopper for feeding beans upon the said belt, pneumatic tubes with spring cups at their outer ends, and means for operating the conveyer and causing suction in the tube.

Other features and advantages of the invention will appear from the following description, taken in connection with the drawings, wherein:—

Figure 1 is a cross section through the device.

Figure 2 is an end view of the device.

Figure 3 is a part section similar to the section shown in Figure 1, showing an alternate arrangement for driving the conveyer.

Figure 4 is a plan view of the device with the hopper omitted.

Figure 5 is a detail showing one of the spring cups for picking up the beans.

In the drawings I have shown my device as it would be constructed wherein numeral 1 indicates the conveyer upon which the beans are fed to be picked, numeral 2 the fan for creating the suction, and numeral 3 the frame.

The conveyer 1 is formed with a head pulley 4 and a tail pulley 5 which are mounted on shafts 6 and 7 between the sides of the frame and the upper part of the conveyer is provided with a table 8 over which the upper part passes and which forms a backing so that a pressure may readily be exerted upon the conveyer. The shaft 6 extends beyond the casing and has a pulley 9 on its outer end which is driven from a pulley 10 on a shaft 11 by a belt 12. The shaft 11 is provided with offset portions 13 and 14 thereby forming a crankshaft and the offset portions are connected to pedals 15 and 16 by rods 17 and 18. The pedals are pivotally supported on a rod 19 and it will be observed that as the pedals are moved upward and downward, they will rotate the shaft 11 and this shaft will in turn operate the conveyer. It will be seen that the conveyer may therefore be operated at any convenient speed and the speed may be varied to accommodate the operator.

The fan 2 may be of any suitable design and may be arranged in any suitable manner. The suction opening of the fan is connected by a tube 20 to a Y 21 and both branches of the Y are connected to flexible tubes 22 which are provided with spring cups 23 at their outer ends. The cups are formed as shown in Figure 5 with tubes 24 having clips 25 at one side upon which the thumb may be placed as the device is held somewhat similar to a pencil between the thumb and forefinger and the lower end is provided with a spring 26 which extends slightly beyond the end of the tube. It will be observed that as the cups 23 are placed over a bean and pressed downward, the suction will pass through the coils of the spring until the cup is pushed downward and when the spring is compressed, the suction will immediately draw the bean through the tube and through the fan from where it may drop into a bag or container which is indicated by the numeral 27. The shaft of the fan 2 may be provided with a pulley 28 which is driven by a pulley 29 on a motor 30 by a belt 31. It will be observed that as the motor is started, the fan will create a continuous suction in the tubes 22.

The fan shaft is also provided with a worm 31 that meshes with a worm gear 32 on a shaft 33 and the shaft 33 is provided with a pulley 34 that drives a pulley 35 on the shaft 6 through a belt 36 as shown in Figure 3. It is understood that any suitable speed ratio may be obtained between the conveyer and the motor by changing the sizes of the gears or pulleys.

It will be understood that changes may be made in the construction without departing from the spirit of the invention.

One of which changes may be in the design of the conveyer, another may be in the use of the device with the conveyer stationary or with the beans falling upon a flat smooth surface, or an inclined surface, another may be in the use of any other means for creating the suction and still another may be in the use of other means for operating the conveyer or fan.

The construction will be readily understood from the foregoing description. To use the device, it may be assembled in any suitable frame, which in the design shown, is indicated by the numeral 3 and provided with a central portion 37, a hopper 38 and legs 39 upon which the portion 37 is supported. The hopper 38 is provided with an adjustable baffle 40 so that the size of the outlet thereof may readily be adjusted to control the amount of beans that pass upon the conveyer and the forward legs 39 of the frame may be provided with slidable bars 41 which are held in thumb screws 42 so that the forward end of the device may be raised or lowered to vary the angle of the incline of the conveyer so that the device may be used for peas or the like. It is also understood that although the device has been specifically described as a means for sorting beans, it may also be used for sorting or picking any other suitable objects.

Having thus fully described the invention, what I claim as new and desire to secure by Letters Patent, is:—

In a sorting device of the class described, an endless belt, pulleys over which the belt passes, means for supporting the pulleys to hold the belt in an inclined position, a small pulley at one end of one of the said belt pulleys, a crank shaft rotatably supported adjacent the said endless belt, a pulley on one end of the said crank shaft, a belt passing over the said latter pulley and also over the small pulley on the said endless belt pulley, pedals rotatably supported adjacent the said crank shaft, rods connecting the ends of the said pedals to the said crank shaft, means for readily changing the inclination of the said belt, a suitable hopper directly above the upper end of the said endless belt, suitable suction tubes by which objects may be readily picked from the said belt, means for supporting a device for receiving the objects from the lower end of the said belt positioned directly below the belt, means positioned below the belt and hopper for receiving the picked objects, and the relative positions of the said device being such that one operator may sit at the end of the said belt and hold a suction tube in each hand, and operate the machine with his feet.

JOHN W. WRIGHT.